US012668547B2

(12) United States Patent
Bär et al.

(10) Patent No.: US 12,668,547 B2
(45) Date of Patent: Jun. 30, 2026

(54) CERAMIC MIXTURE FOR PRODUCING MOULDED ARTICLES, METHODS FOR THE PRODUCTION THEREOF, AND USE THEREOF

(71) Applicant: Pritidenta GmbH, Leinfelden-Echterdingen (DE)

(72) Inventors: Arthur Bär, Pforzheim (DE); Berthold Reusch, Munich (DE); David Figge, Lorsch (DE)

(73) Assignee: Pritidenta GmbH, Leinfelden-Echterdingen (DE)

( * ) Notice: Subject to any disclaimer, the term of this patent is extended or adjusted under 35 U.S.C. 154(b) by 258 days.

(21) Appl. No.: 18/256,815

(22) PCT Filed: Dec. 9, 2021

(86) PCT No.: PCT/EP2021/085035
§ 371 (c)(1),
(2) Date: Jun. 9, 2023

(87) PCT Pub. No.: WO2022/122945
PCT Pub. Date: Jun. 16, 2022

(65) Prior Publication Data
US 2024/0043341 A1 Feb. 8, 2024

(30) Foreign Application Priority Data

Dec. 10, 2020 (EP) .................................... 20213180

(51) Int. Cl.
| | |
|---|---|
| *B33Y 10/00* | (2015.01) |
| *A61C 13/00* | (2006.01) |
| *A61C 13/083* | (2006.01) |
| *B33Y 40/20* | (2020.01) |
| *B33Y 50/00* | (2015.01) |
| *B33Y 70/00* | (2020.01) |
| *B33Y 80/00* | (2015.01) |
| *C04B 35/486* | (2006.01) |
| *C04B 35/624* | (2006.01) |
| *C04B 35/626* | (2006.01) |
| *C04B 35/636* | (2006.01) |
| *C04B 35/64* | (2006.01) |

(52) U.S. Cl.
CPC ........ *C04B 35/486* (2013.01); *A61C 13/0019* (2013.01); *A61C 13/0022* (2013.01); *A61C 13/083* (2013.01); *B33Y 10/00* (2014.12); *B33Y 40/20* (2020.01); *B33Y 50/00* (2014.12); *B33Y 70/00* (2014.12); *B33Y 80/00* (2014.12); *C04B 35/624* (2013.01); *C04B 35/6264* (2013.01); *C04B 35/636* (2013.01); *C04B*
*35/64* (2013.01); *C04B 2235/3246* (2013.01); *C04B 2235/6026* (2013.01); *C04B 2235/606* (2013.01); *C04B 2235/612* (2013.01)

(58) Field of Classification Search
None
See application file for complete search history.

(56) References Cited

U.S. PATENT DOCUMENTS

| | | | |
|---|---|---|---|
| 2004/0067465 A1* | 4/2004 | Schomann | A61C 13/0004 433/26 |
| 2007/0281353 A1* | 12/2007 | Vacanti | C12N 5/0062 435/372 |
| 2011/0151411 A1* | 6/2011 | Schechner | A61K 6/822 433/222.1 |
| 2017/0081500 A1 | 3/2017 | Bredt et al. | |
| 2019/0337235 A1* | 11/2019 | Moosberg | B33Y 30/00 |
| 2020/0172444 A1 | 6/2020 | Bonderer et al. | |

FOREIGN PATENT DOCUMENTS

| | | |
|---|---|---|
| CN | 109111223 | 1/2019 |

OTHER PUBLICATIONS

International Search Report (with English translation) for corresponding Application No. PCT/EP2021/085035, mailed on May 19, 2022, 9 pages.

* cited by examiner

*Primary Examiner* — Mohammad M Ameen

(74) *Attorney, Agent, or Firm* — Dority & Manning, P.A.

(57) ABSTRACT

The present invention relates to a ceramic mixture which is suitable for producing moulded articles, preferably dental moulded articles, and to methods for producing the ceramic mixture. The invention also relates to the use of a ceramic mixture for producing moulded articles, preferably dental moulded articles, in particular dental restorations, such as an inlay, onlay, veneer, crown, bracket, bridge, framework, abutment or implant. The invention also relates to methods for producing a moulded article, preferably a dental moulded article comprising applying a ceramic mixture to a carrier or to a positive model, and solidifying the moulded articles thus obtained by gel formation, preferably by means of a standard 3D printer capable of processing paste-like materials. The gel-like moulded article thus obtained can be worked in the gel-like and/or dried state. In a preferred embodiment, the paste-like materials are applied such that the moulded article has an inner layer consisting of a first ceramic material and an outer layer consisting of another ceramic material. The paste can be applied in horizontal layers and/or points and in vertical layers and/or points. The moulded article is preferably a dental moulded article.

7 Claims, 2 Drawing Sheets

CERAMIC MIXTURE FOR PRODUCING MOULDED ARTICLES, METHODS FOR THE PRODUCTION THEREOF, AND USE THEREOF

PRIORITY CLAIM

This application is based upon and claims the right of priority under 35 U.S.C. § 371 to International Application No. PCT/EP2021/085035 filed on Dec. 9, 2021, which claims the benefit of Application Serial Number EP 20213180.1 filed Dec. 10, 2020. Applicant claims priority to and the benefit of each of such applications and incorporate all such applications herein by reference in its entirety.

TECHNICAL FIELD OF THE INVENTION

This invention relates to a ceramic mixture which is suitable for producing moulded articles, preferably dental moulded articles, and to methods for producing the ceramic mixture. In addition, the invention relates to the use of a ceramic mixture producing moulded articles, preferably dental moulded articles, in particular dental restorations, such as an inlay, an onlay, a veneer, a crown, a bracket, a bridge or a framework, an abutment or an implant. The invention also relates to methods for producing a moulded article, preferably a dental moulded article, comprising the application of a ceramic mixture to a carrier or to a positive model, and solidification of the moulded article thus obtained by gelation, preferably by means of a standard 3D printer capable of processing paste-like materials. The gel-like moulded article thus obtained can be processes in the gel-like and/or dried state. In a preferred embodiment, the application of the paste-like materials is performed in such a way that the moulded article has an inner layer consisting of a first ceramic material and an outer layer consisting of another ceramic material. The paste can be applied in horizontal layers and/or points and in vertical layers and/or points. The moulded article is preferably a dental moulded article.

BACKGROUND OF THE INVENTION

In the last decades, the demand for cost-effective, aesthetic dental materials has increased drastically in restorative dentistry. Most patients desire their dental restorations to resemble the natural tooth structure as well as the colour and translucency of a natural tooth. A natural tooth does not have a uniform colouring and translucency. Further, each tooth is individual in its three-dimensional shape. Therefore, the production of dental prostheses, such as bridges, requires three-dimensional colouring and translucency. Each artificial tooth should be clearly distinguishable from the adjacent tooth by colour. The colour gradient within a tooth should be homogeneous from the enamel to the gingival preparation margin (dentin). Compared to the dentin, the enamel is more translucent and less colour intense. Therefore, the upper enamel area of a tooth looks brighter and more translucent than the lower part of a tooth.

The use of ceramic or metallic powders for the production of dental restorations, i.e. dental prostheses or whole teeth, such as implants or inlays, onlays, veneers, crowns or bridges, has been known for a long time. Composite materials made of ceramics and metal, so-called cermets, are also generally known. Oxide ceramics are mainly used as a framework material for dental restorations, because they are characterized by excellent biocompatibility, high strength and outstanding mechanical properties. In the recent times, preferred starting materials have been ceramic powders and/or ceramic granules based on $ZrO_2$, $Al_2O_3$, zirconia toughened alumina (ZTA), alumina toughened zirconia (ATZ), $B_4C$, SiC, $Si_3N_4$ or $TiO_2$. In each case, the zirconia is stabilized, and preferably CaO, $Y_2O_3$, $La_2O_3$, $CeO_2$, MgO, $Er_2O_3$, $Pr_2O_3$ and/or $Nb_2O_5$ are used as stabilizers. A particularly preferred ceramic material is partially or fully stabilized zirconia.

Generally, a conventional method for producing dental restorations consists of several sub-steps. In a first step, the starting material is pressed to a green body. This process is usually followed by pre-firing and so-called white firing, which produces a stable dental blank for further processing, in particular further CAD/CAM processing. The starting material generally contains a so-called binder to make the powder press-formable. Polysaccharides, such as starch, sugar or cellulose derivatives, polymers, such as polyvinyl acetates, polyvinyl alcohols, polyvinylpyrrolidones or polyacrylates are used as binders. A binder should preferably not have any tendency to stick to the moulding tools, solidify the starting material in such a way that it is possible to process the green body, and allow to be burnt out of the blank again completely and without residue during the firing processes.

Additive manufacturing methods, in which different materials are formed into an individual body by an additive production process, for example by means of 3D printers, are nowadays not only used for the production of prototypes, but also for the manufacture of various products in small series or even in high volumes. The range of additive manufacturing methods, in which 3-dimensional models or components are manufactured from computer-aided design data (CAD data), has increased significantly in recent years. Additive methods can already be used to manufacture products with individual geometries and a variety of material properties. An example of individually shaped bodies with different material properties is an individually formed dental restoration.

Additive manufacturing methods include, among others, stereolithography (SLA), digital light processing (DLP), which differs from the SLA process only in that a larger area can be exposed by means of a projector, continuous digital light processing (CDLP), fused deposition modelling (FDM), material jetting (MJ), nanoparticle jetting (NPJ), drop on demand (DOD), binder jetting (BJ), multi-jet fusion (MJF), selective laser sintering (SLS), direct metal laser sintering or also selective laser melting (DMLS/SLM), electron beam melting (EBM), laser engineering net shape (LENS), electron beam additive manufacturing (EBAM) or laminated object manufacturing (LOM).

WO 2018/039688 A1 (EP 3 507 074 A1) describes an additive method for solidifying a photopolymerizable diffusely reflective material. This method is also referred to as lithography-based ceramic manufacturing (LCM) technology. It makes it possible that additively manufactured ceramics, including dental restorations, can be produced in series production by means of 3D printers. In this method, a mixture of photopolymers and a ceramic (such as zirconia) is cured by directed UV radiation, i.e. by means of light. The UV radiation initializes a polymerization process in which the polymer particles in the suspension combine with each other and solidify. The green body produced in this way consists partly of ceramic and partly of plastic. During the subsequent sintering process, the plastic parts are removed from the component. A disadvantage of the stereolithography process is that photopolymerizable monomers and photoinitiators which are often toxic are used in this technology.

Therefore, the method can only be carried out using appropriate safety equipment. Furthermore, it is to be considered negative that components produced by stereolithography have to be post-cured in order to cure remaining, not cured material. In addition, the printed components must be subsequently cleaned in an alcoholic solution. Another significant disadvantage of this method is the fact that the production of dental ceramics using (LCM) technology is combined with serious losses in translucency. Translucency, however, is one of the most important aesthetic properties that a dental material must fulfil.

From US 2018/0127317 A1, a sol is known which is suitable as a starting material for the production of ceramic articles by means of additive processes, in particular by SLA techniques. The material is used for processing, in particular processing by SLA techniques, and contains photopolymerizable monomers as well as photoinitiators which polymerize by radiation and lead to a gel network. A major disadvantage of this method is that the monomers and photoinitiators contained in the sol are toxic. As it is the case with LCM technology, post-curing is usually required after printing. A further disadvantage of the sol is its complex composition and preparation. Other disadvantages are the very long drying time and the very complex supercritical extraction (>23 h) used until dried aerogels are obtained.

EP 3 659 989 A1 and US 2020/0172444 A1 apply the laser induced forward transfer (LIFT) method known from EP 1 268 211 81 to the production of ceramic or (glass) ceramic moulded parts and adapt the known slurries as well as the LIFT method. A LIFT method is understood to be a method in which a small amount of material is removed out of a print material by an energy pulse and transferred to a receiving substrate. The energy pulse is preferably generated by a laser. In this process, the laser beam is focused on a small area of the slurry or support material so that the print material is heated locally to such an extent that at least one component of the slurry expands abruptly. This component is also called the volume expansion component. The energy transformation component absorbs the laser energy and transfers it to the slurry or the support material. The abruptly vaporizing volume expansion component entrains the slurry or support material and transfers it to the receiving substrate. It is also possible that the volume expansion component directly absorbs a part of the energy. A disadvantage of this method is the need for using a laser, or the need for very strong radiation, which heats the print material locally and abruptly to such an extent that certain components of the slurry expand. As lasers are very expensive, the method loses its attractiveness for the production of dental materials. Another disadvantage of this method is that a suitable energy transformation component must be used. Furthermore, the complex preparation of the required slurries is disadvantageous, as for the formation of homogeneous layers, the slurries, support structures and carrier substrates must be very well matched to each other.

DE 10 2017 106 101 A1 discloses a method in which a moulded article is produced by generative manufacturing. The moulded article can be a dental moulded article for the dental restoration and/or a dental moulded article in the form of a dental prosthesis and/or auxiliary parts for such a dental moulded article. The method comprises a method step a) in which a blank, in particular a green body, is provided. In process step a), at least one layer of a dispersion is provided. The dispersion is water-based, ceramic-based and/or glass-ceramic-based and/or powder-metal-based. Furthermore, in process step a), the layer of the dispersion is solidified at least in spots by applying hardeners onto the dispersion layer. In process step b), which preferably follows process step a), the (green body) blank is sintered to form the moulded article. A disadvantage of this method is that the use of several hardeners is required. In process step a), the use of at least two hardeners with different material compositions is necessary. Another disadvantage is the time-consuming colour adjustment. In order to be able to adjust the colour, different metal cations of different transition metals are added to at least one hardener in order to be able to achieve, apart from curing, additional colourings. Moreover, this method is combined with long production times.

US 2019/0337235 A1 describes a method for the three-dimensional printing of an object using a support structure. This method is intended to provide an improved system for building-up overhanging and heavy three-dimensional objects. In this method, the support structure as well as the actual component is printed in each layer. The support structure stabilizes heavy objects during printing. In addition, a structural additive is used to prevent the support structure from bonding to the object during subsequent sintering of the object. The support structure and the three-dimensional object are made of the same starting material. The starting material, the so-called crafting medium, is a commercially available metal clay, which consists of very small metal particles such as gold, bronze or copper, or a ceramic powder. The metal clay or ceramic powder is mixed with an organic binder and with water. Examples of organic binders which can be used for this purpose are cellulose materials, agar or sodium alginate. However, the starting material does not contain a dispersing agent. A major disadvantage of this method is the necessity of printing a support structure. Another reason why the method is out of question for the production of dental moulded articles is the fact that it is very time-consuming due to the printing of support structures.

CN 109111223 A and CN109111223 B disclose a ceramic titanium dioxide suspension for 3D printing and a method for the production thereof. The ceramic titanium dioxide suspension contains from 60.00 to 75.00 wt. % ceramic titanium dioxide material, from 0.30 to 1.20 wt. % dispersing agent, from 0.05 to 2.00 wt. % binder, and from 21.80 to 39.65 wt. % solvent, wherein the dispersing agent is selected from a combination of one or more of sodium hexametaphosphate, sodium citrate, and sodium tripolyphosphate. The binder is selected from sodium alginate, sodium carboxymethylcellulose, polyethylene glycol, and kaolin. The parts produced from the ceramic titanium dioxide suspension are used in the fields of biomaterials and photocatalysis. Titanium dioxide is often used as a colour pigment in paints, varnishes, paper textiles, cosmetics, as a UV protection in sun creams, and as a ceramic filter. However, titanium dioxide is less suitable as a construction ceramic. Because of its mechanical and aesthetic properties, this material is not suitable at all for dental prostheses.

US 2017/0081500 A1 describes a material system and a method for the production of fire-resistant 3D printed objects by means of acid-catalysed copolymerization of dry granules or sand and furan monomers. In this method, a first mixture is provided comprising a first particle-like component with a fire-resistant material, and at least one reactive component, for example a carbohydrate. This first mixture is treated with an acid to form a first reactive particle-like mixture. A dry granular material coated with a reactive component is produced in this way. A flat layer of this dry particle mixture is spread onto a building surface. An inkjet print head is used for spraying a liquid binder containing a furan monomer, for example furfuryl alcohol, onto this particle mixture. The carbohydrate is hydrolysed by reaction with the acid into short-chain residues which are soluble in the furan monomer. The acids used are sulphuric acid, *sulphurous* acid, toluene sulphonic acid, xylene acid, methane sulphonic acid and/or benzene sulphonic acid. These acids are homogeneous catalysts for the polymerization of furan monomers. The first reactive particle-like mixture copolymerizes with the furan monomer. A disadvantage of this method is the necessity of using strong acids as homogeneous catalysts and the necessary conversion of materials from the group of carbohydrates, cellulose and their derivatives.

None of the starting materials described in the prior art, such as the slurries, suspensions or sols described above, and none of the known additive methods are optimally suited for the technically simple and cost-effective production of moulded articles, in particular dental moulded articles.

Consequently, there is a need for alternative, non-toxic or at least less toxic starting materials that are suitable for the production of moulded articles. The alternative starting materials should be suitable in particular for the production of dental moulded articles and also have a colour, brightness and translucency gradient that is comparable to the colour, brightness and translucency gradient of a natural tooth. Colour, brightness or translucency transitions should ideally not be seen in the final dental moulded article. Therefore, the production of mono-material and multi-material dental moulded articles achieved by a horizontal and vertical build-up via layers and/or points is of particular interest. Moreover, the starting material should make it possible to produce dental moulded articles in additive methods using 3D printers. Furthermore, it should be possible to adjust the colour of the dental moulded article in a simple, cost-effective manner.

SUMMARY OF THE INVENTION

The present invention relates to a ceramic mixture which is suitable for producing moulded articles, in particular dental moulded articles, containing the following components:

- (a) an uncoloured and/or a coloured ceramic powder and/or an uncoloured and/or a coloured ceramic granule and/or combinations thereof based on $ZrO_2$, $Al_2O_3$, zirconia toughened alumina (ZTA), alumina toughened zirconia (ATZ), $B_4C$, SiC, or $Si_3N_4$, wherein the $ZrO_2$ is stabilized in each case;
- (b) at least one dispersing agent;
- (c) at least one hydrocolloid, preferably at least one polysaccharide and/or protein; and
- (d) at least one solvent.

In one embodiment of the ceramic mixture described herein, the component (a) contains ceramic powders and/or ceramic granules based on $ZrO_2$, $Al_2O_3$, ZTA, or ATZ, wherein in each case the $ZrO_2$ is stabilized with CaO, $Y_2O_3$, $La_2O_3$, $CeO_2$, MgO, $Er_2O_3$, $Pr_2O_3$ and/or $Nb_2O_5$, particularly preferably based on stabilized $ZrO_2$.

In one embodiment, the ceramic mixture described herein comprises from 35 wt. % to 99 wt. %, preferably from 75 wt. % to 95 wt. % of the component (a).

In one embodiment, the ceramic mixture described herein contains as a dispersing agent (b) amino alcohols, such as ethanolamine, carboxylic acids, such as maleic acid and citric acid, carboxylic acid salts, such as citric acid salts or vinylogous carboxylic acids, such as ascorbic acid, and salts thereof, as well as mixtures thereof, preferably at least one dispersing agent selected from ethanolamine, citric acid, citric acid salts, and ascorbic acid, particularly preferred are L-ascorbic acid and diammonium hydrogen citrate.

In one embodiment, the ceramic mixture described herein contains at least one hydrocolloid (c) selected from the group of gelatine, gellan gum, hydroxypropyl guar, caseinate, agar, agarose, carrageenan, alginate, xanthan, dextran, scleroglucan, starch, cellulose, a cellulose derivative, pectin, gum arabic, galactomannans, glucomannan, and carubin, or mixtures thereof.

In a preferred embodiment, the ceramic mixture described herein contains as a hydrocolloid (c) a combination of two hydrocolloids, preferably of alginate and pectin, or of gelatine and xanthan gum.

In the present invention, the hydrocolloid (c) is used as a gelling agent.

In one embodiment, the ceramic mixture described herein additionally contains at least one binder as a component (e) and/or at least one preservative as a component (f) and/or at least one plasticizer as a component (g) and/or at least one anti-drying agent as a component (h).

Furthermore, the present invention relates to a method for producing a ceramic mixture as defined herein, which is suitable for the production of moulded articles, in particular for the production of dental moulded articles, comprising the following steps:

- (a) adding a dispersing agent to a solvent;
- (b) producing a suspension of an uncoloured and/or a coloured ceramic powder and/or a ceramic granule and/or a combination thereof by adding an uncoloured and/or a coloured ceramic powder and/or a ceramic granule and/or a combination thereof to the solution of a dispersing agent obtained in step (a);
- (c) producing an aqueous solution of at least one hydrocolloid;
- (d) adding the aqueous solution of at least one hydrocolloid obtained in step (c) to the suspension obtained in step (b) so that an aqueous colloidal ceramic suspension is obtained; and
- (e) reducing the solvent content of the aqueous colloidal ceramic suspension obtained in step (d) so that a ceramic mixture is obtained.

In one embodiment, the ceramic mixture obtained according to the method of the invention is a colloidal ceramic mixture, preferably a colloidal ceramic paste.

Furthermore, the present invention relates to a ceramic mixture obtainable by a method described herein, preferably a colloidal ceramic mixture.

In a particularly preferred embodiment, the present invention relates to a colloidal ceramic paste obtainable by a method described herein.

Furthermore, the present invention relates to the use of a ceramic mixture described herein for producing moulded articles, preferably dental moulded articles, preferably dental restorations, such as an inlay, an onlay, a veneer, a crown, a bracket, a bridge or a framework, an abutment or an implant.

The production of mono-material or multi-material dental mouldings is preferred in particular.

A further subject matter of the present invention is a method for producing a moulded article, in particular a dental moulded article, comprising the following steps:

- (a) applying a first ceramic mixture described herein to a carrier or to a positive model, obtaining a moulded article in this way;
- (b) solidifying the moulded article thus obtained by gelation to form a gel-like moulded article, and gel-like moulded article; and

(c) possibly repeating steps (a) and (b) with a second or further ceramic mixture having the same or a different composition as the first ceramic mixture.

In one embodiment of the method according to the invention, in step (a) a ceramic mixture, preferably a colloidal ceramic paste, is applied to generated positive models by material deposition, (a1) preferably with a syringe-stamp system and/or with an extruder system; and/or (a2) preferably, the surface of the positive model is additionally provided with a release agent to facilitate the removal of the cured moulded article from the surface of the positive model; and/or (a3) preferably, the application is carried out continuously; and/or (a4) preferably, layers with a thickness of 0.01 mm to 5 mm are applied.

In one embodiment of the method according to the invention, the solidification of the ceramic moulded article is carried out in step (b) by means of gelation by adding a metal salt solution, by setting a defined temperature, and/or by in situ gelatinization.

In one embodiment of the method according to the invention, in step (b) the solidification of the moulded ceramic article thus obtained by gelation is started by one or more of the following steps:

(b1) wetting a ceramic mixture described herein, preferably a colloidal ceramic paste, by a syringe and/or by an extruder and/or by atomization and/or by immersion of the moulded article in a metal salt solution; or (b2) falling below a defined temperature, wherein the moulded article is preferably briefly cooled down to a temperature of less than 35° C.; or (b3) exceeding a defined temperature, wherein the moulded article is preferably briefly heated to a temperature of higher than 35° C.; or (b4) in situ gelatinization, wherein the moulded article containing a calcium salt with low solubility is mixed with an acidifying agent.

In addition, the present invention relates to a gel-like moulded article obtainable in a method according to the invention described above, wherein it is preferably a mono-material or multi-material gel-like dental moulded article.

In one embodiment, this gel-like moulded article comprises an inner layer consisting of a first material and an outer layer consisting of another material.

In a preferred embodiment, it is a multi-material gel-like moulded article consisting of a plurality of layers which may be vertically and/or horizontally arranged.

In one embodiment of the method according to the invention, in a further step (d), the moulded article thus obtained is post-processed in the green state by means of subtractive processes prior to sintering, preferably by subtractive processes such as, for example, cutting, polishing, grinding and milling.

Another subject matter of the present invention is a method for producing a printed dental restoration, comprising the following steps:

(d) printing or milling out the possibly overdimensioned dental restoration from a dimensionally stable material, which is used as a positive model in the later printing process;

(e) modelling an inner dentin core as well as an outer enamel layer on the basis of the scanned tooth by using the CAD software or by virtual predefined tooth restorations;

(f) disassembling the modelled, possibly overdimensioned, tooth restoration into horizontal and vertical layers;

(g) preparing path and milling strategies for the application and subsequent removal of the (ceramic) print materials used;

(h) applying a release agent as described herein to the correspondingly overdimensioned, dimensionally stable dental restoration;

(i) printing the virtually created dental restoration, which has been divided into horizontal layers, on the previously created dimensionally stable tooth restoration;

(j) solidifying the dental restoration by gelation according to the method described herein, in particular according to one of the steps (b1), (b2), (b3), or (b4) as defined above;

(k) drying the printed dental restoration;

(l) machining the surface of the printed dental restoration; and (m) sintering the printed dental restoration.

Furthermore, the present invention relates to a printed dental restoration obtainable by the method described above comprising the steps (d), (e), (f), (g), (h), (i), (j), (k), (l) and (m).

DETAILED DESCRIPTION OF THE INVENTION

Definitions

Figure 1:
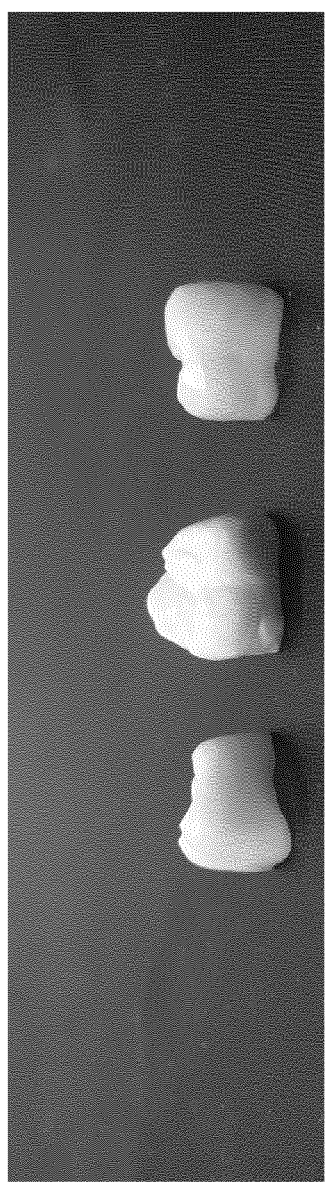
FIG. 1 shows several dental moulded articles, i.e. three different dental crowns, which were produced by the method disclosed in the present invention and by a subtractive post-process from the ceramic mixture according to the invention containing sodium alginate.

In the present application, including the claims, the terms listed below have the following meanings.

The term "moulded article" refers to a blank which can be further processed. In this context, the term "dental moulded article" is understood to mean a blank, in particular a green body, which can be further formed to a dental restoration, or which itself already has the shape of a dental restoration.

The term "mono-material moulded article" is understood to mean a blank which has been made of one material. For the purposes of the present invention, it is understood to be a moulded article which has been produced using the ceramic mixture according to the invention. According to the invention, a mono-material moulded article as described herein may be obtained by repeatedly applying the same ceramic mixture to a carrier or to a positive model and solidifying the ceramic mixture.

The term "multi-material moulded article" is understood to mean a blank which has been made of at least two different materials. For the purposes of the present invention, it is understood to be a moulded article which has been produced using at least two ceramic mixtures with different compositions. According to the invention, a multi-material moulded article as described herein can be obtained by applying a first ceramic mixture onto a carrier or onto a positive model and solidifying the ceramic mixture, and applying at least one further ceramic mixture having a different composition and solidifying it.

The term "gel-like moulded article" is understood to mean a blank having a gel-like consistency and a certain dimensional stability.

The term "dental restoration" is understood to mean any dental restorative material that is used to restore the function, integrity and morphology of the missing hard tooth tissue, in particular an inlay, an onlay, a veneer, a crown, a bracket, a bridge or a framework, an abutment or an implant.

The term "round blank" is understood to mean a 3-dimensional disc made of a material which can be used to produce a dental restoration.

The term "thin disc" is understood to mean a disc used for colour and translucency measurements.

The term "powder" is understood to mean a binder-free, dry mass which consists of a large number of fine particles and can flow freely if it is shaken or tilted. In a preferred embodiment, the mass is meant to be a coloured and/or uncoloured binder-free powder batch and/or masterbatches.

The term "masterbatch" is understood to mean a stabilized zirconia which can contain colouring additives, preferably colouring metal oxides. Preferably, coloured powders are used. Coloured powders within the meaning of the present invention are in particular white, yellow, pink or grey powders. Masterbatches in the colours white, yellow, pink and grey are commercially available. Preferred masterbatches are commercially available powders from the manufacturer Tosoh, for example the Zpex® White, Zpex® Yellow and Zpex® Grey variants stabilized with 3 mol % yttria, the Zpex® 4 White, Zpex® Yellow and Zpex® Grey variants stabilized with 4 mol % yttria, and the Zpex® Smile, Zpex® Smile Yellow, Zpex® Smile Grey variants stabilized with 5 mol % yttria. A Zpex® Pink stabilized with erbium oxide can be universally used as a colouring masterbatch for all 4 mol % and 5 mol % stabilization types. Masterbatches increase process reliability and are easy to process. Coloured powders and/or masterbatches from other manufacturers can also be used as powders and/or masterbatches.

The term "colloidal ceramic mixture" is understood to mean a colloidal solution which is based on a ceramic powder and, due to its particle size, are between true molecular disperse solutions and coarsely disperse suspensions.

The term "hydrocolloid" is understood to mean a group of polysaccharides and proteins which get dissolved as colloids in water or aqueous solvents and are characterized by a high capacity for gelation. Within the meaning of the present invention, the term "hydrocolloid" is thus understood to mean "hydrocolloids suitable for gelation". In the present invention, hydrocolloid (c) is used as a gelling agent.

The terms "colour" and "coloured" are understood to mean the colour, brightness and translucency of a material, body or layer. According to the invention, the terms "colour" and "coloured" refer in particular to the brightness of a material, body or layer. Therefore, changes in colour are understood to be, in particular, changes in brightness.

Colours can be characterized, for example, by their Lab value, which is also referred to as CIE L*a*b. The CIELAB colour space is a colour space defined by the International Commission on Illumination (CIE) in 1976. Alternatively, colours can also be characterized by a colour code commonly used in the dental industry. Examples of such colour codes are the Vitapan Classical® and the Vita 3D Master®, both from VITA Zahnfabrik H. Rauter GmbH & Co. KG, and the Chromascop® from Ivoclar Vivadent AG. The term "VITA tooth colour(s)" is understood to mean, for example, the gradual 16 VITA classical A1-D4 shade guid, which serves to exactly determining the tooth shade, and the 32 3D-master shade guide VITA basic colours. The arrangement of the shades in the VITA classical family of shades is as follows: A1, A2, A3, A3.5, A4 (reddish-brownish), B1, B2, B3, B4 (reddish-yellowish), C1, C2, C3, C4 (greyish shades), D2, D3, D4 (reddish-grey).

The term "translucency" is understood to mean the light transmission capacity of a material, e.g. a blank or dental article, i.e. the ratio of transmitted to incident light intensity.

The term "machining" means milling, grinding, cutting, carving or shaping a material by a machine. Milling is usually faster and more cost-effective than grinding. A "machinable article" is an article having a 3-dimensional shape and sufficient strength to be machined.

The term "positive model" is understood to mean a defined print surface.

The term "support structure" is understood to mean structures in the field of 3D printing that reinforce overhangs and other weak points. They are removed after the 3D printing process. Support structures consist of three components: raft, framework and points of contact. The raft forms a base that adheres to the construction platform. The framework emerges from the raft and secures its part during printing. Contact points are areas where the framework and print meet each other.

The term "standard 3D printer" is understood to mean a 3D printer which, due to a possibly modified print head, is capable of processing paste-like materials, for example by means of 3D printing processes known to persons skilled in the art, such as fused deposition modelling (FDM), robocasting 3D printing technique, direct ink writing or liquid deposition modelling (LDM).

Ceramic Mixture and Method for the Production Thereof According to the Invention As explained above, none of the starting materials described in the prior art, in particular the slurries, suspensions or brines described above, and none of the known additive processes are optimally suited for the technically simple and cost-effective production of moulded articles, especially for the production of dental moulded articles.

Therefore, there is a need for alternative, non-toxic or at least less toxic starting materials that are suitable for the production of moulded articles. The alternative starting materials should be suitable, in particular, for the production of dental moulded articles, which have a colour, brightness and translucency gradient that corresponds to the colour, brightness and translucency gradient of a natural tooth.

Ideally, no colour, brightness or translucency transitions should be visible in the final dental moulded article. In addition, the starting material should, as far as possible, allow the production of dental moulded articles in simple additive processes using standard 3D printers. Furthermore, it should be possible to adjust the colour of dental moulded articles in a simple, cost-effective manner.

Therefore, a task of the present invention is to provide an alternative starting material and a method for its production, which makes it possible to produce moulded articles, in particular dental moulded articles, by means of additive processes. The method for producing the dental moulded articles should allow to adjust the chemical and physical properties of the moulded article in one dimension, in two dimensions or in three dimensions. Ideally, the starting material should be usable in 3D printers without having the disadvantages of the known starting materials.

It has been found now that this task is solved by a ceramic mixture containing the following components:

(a) an uncoloured and/or a coloured ceramic powder and/or an uncoloured and/or a coloured ceramic granule and/or combinations thereof based on $ZrO_2$, $Al_2O_3$, zirconia toughened alumina (ZTA), alumina toughened zirconia (ATZ), $B_4C$, SiC, or $Si_3N_4$, wherein $ZrO_2$ is stabilized in each case;

(b) at least one dispersing agent;

(c) at least one hydrocolloid, preferably at least one polysaccharide and/or a protein; and (d) at least one solvent.

Preferably, a hydrocolloid suitable for gelation is used as a component (c).

In a preferred embodiment, the ceramic mixture according to the invention is provided as a colloidal ceramic mixture. In a particularly preferred embodiment, it is provided as a colloidal ceramic paste.

Surprisingly, it has been found that the above-described ceramic mixture is suitable for the production of moulded articles, in particular of dental moulded articles, and that the use of this ceramic mixture allows the production of moulded articles with the properties required for dental restorations, such as high density, high bending strength and high translucency.

The ceramic mixture according to the invention has a number of advantages. For example, the ceramic mixture according to the invention is also suitable for the production of moulded articles by additive processes. Surprisingly, the ceramic mixture according to the invention can also be processed in low-cost standard 3D printers.

In contrast to the slurries known from EP 3 659 989 A1 or US 2020/0172444 A1, the ceramic mixture according to the invention does not contain an energy transformation component.

In a preferred embodiment, the present invention therefore relates to a ceramic mixture containing the following components:

(a) an uncoloured and/or a coloured ceramic powder and/or an uncoloured and/or a coloured ceramic granule and/or combinations thereof based on $ZrO_2$, $Al_2O_3$, zirconia toughened alumina (ZTA), alumina toughened zirconia (ATZ), $B_4C$, SiC, or $Si_3N_4$, wherein $ZrO_2$ is stabilized in each case;

(b) at least one dispersing agent;

(c) at least one hydrocolloid, preferably at least one polysaccharide and/or protein; and (d) at least one solvent, wherein the ceramic mixture does not contain an energy transformation component.

A further advantage of the ceramic mixture according to the invention is that, in contrast to the known starting materials described above, it is not toxic.

Surprisingly, it was found that the use of a ceramic mixture according to the invention, which preferably contains a combination of at least two hydrocolloids as a component (c), leads to moulded articles, which, in terms of properties such as density and, above all, translucency, hardly differ from a moulded article milled out of a pressed round blank or a block.

A significant advantage of the ceramic mixture according to the invention is that additional colouring components are not required to make a colour adjustment. The ceramic mixture according to the invention makes it possible to adjust the colour of the dental moulded article in a simple and cost-effective manner, since the colour can be adjusted as desired in a simple manner without any effort by the specific selection of coloured powders and/or granules as educts. It is particularly advantageous that, on the basis of the mixture according to the invention, the colour, brightness and translucency of dental moulded articles can be varied in one dimension, in two dimensions or in three dimensions.

The ceramic mixture according to the invention may contain an uncoloured or a coloured ceramic powder or granule, so that the colour of the ceramic mixture can be selectively adjusted. Thus, there is no need to add additional colouring components for the production of the moulded articles. For example, by using coloured ceramic powders as a component (a) of the ceramic mixture, the ceramic mixture according to the invention can be used for the inner dentin layer and a subsequent colour gradient can be achieved by locally removing the colourless, higher-translucent enamel layer.

Surprisingly, the density of the—preferably printed—moulded articles obtained by the method according to the invention is always more than 99%. The density was always determined according to the Archimedes method, known to the persons skilled in the art, at room temperature (i.e. approx. 25° C.).

The strength of the—preferably printed—moulded articles obtained by the method according to the invention depends on the stabilized zirconia ($ZrO_2$) used. For example, when using 5 mol % yttria-stabilized $ZrO_2$ over 660 MPa. The strength was measured according to the ball-on-three-ball method known to the persons skilled in the art.

The translucency of the—preferably printed—moulded articles obtained by the method according to the invention depends on the stabilized zirconia ($ZrO_2$) used. Surprisingly (depending on the stabilized $ZrO_2$ used), it is always over 30%, if coloured 5 mol % yttria-stabilized $ZrO_2$ is used for example). The translucency was determined in the CIELAB colour space over a black and white background and corresponds to 1—complete opacity.

The reciprocal property of translucency is the opacity (O). $O=1/T=I/I0$ (T=transmission, I=intensity of transmitted light, I=intensity of light before permeation). Thus, opacity values less than ca. 0.9 are considered translucent for a thin disc having a thickness of 1 mm and a diameter of 15 mm.

In a particularly preferred embodiment, the component (a) is an uncoloured and/or a coloured powder.

In one embodiment of the ceramic mixture described herein, the component (a) comprises a ceramic powder and/or a ceramic granule based on $ZrO_2$, $Al_2O_3$, ZTA, or ATZ, wherein $ZrO_2$ is always mixed with CaO, $Y_2O_3$, $La_2O_3$, $CeO_2$, MgO, $Er_2O_3$, $Pr_2O_3$ and/or $Nb_2O_5$, particularly preferably based on stabilized $ZrO_2$. A preferred component (a) is a ceramic powder based on $Y_2O_3$ stabilized $ZrO_2$, or based on $Y_2O_3$ and $Er_2O_3$ stabilized $ZrO_2$. A particularly preferred component (a) is a ceramic powder based on $Y_2O_3$ stabilized $ZrO_2$.

The particle size of the component (a) depends on the base of the ceramic powder and/or granules. In the case of $ZrO_2$, e.g. in the case of 3Y-TZP $ZrO_2$, the particle size ranges from 5 nm to 500 nm, preferably from 20 nm to 300 nm. For $Al_2O_3$, the particle size is in the range from 50 nm to 500 nm, preferably in the range from 75 nm to 300 nm.

The colours of the coloured ceramic powders and/or granules are dental tooth colours according to the colour codes commonly used in the dental industry, such as the Vitapan Classic® or the Vita 3D Master®, both from VITA Zahnfabrik H. Rauter GmbH & Co. KG, or the Chromascop® from Ivoclar Vivadent AG. The tooth models of these colour codes each define only one colour, but are constructed, similarly to teeth, of layers of different material mixtures and/or colours and/or translucency and are oriented towards the different colours of human teeth.

In a preferred embodiment, yttrium-based zirconia powders are used as a component (a), which are based on yttria-stabilized zirconia powders from the manufacturer Tosoh, as described in the Technical Data Sheet of Zpex® (3 mol % yttria-stabilized zirconia), Zpex®4 (4 mol % yttria-stabilized zirconia), Zpex® Smile (5 mol % yttria-stabilized zirconia). The zirconia powders consist of zirconia ($ZrO_2$, also referred to as "zirconium oxide") which is stabilized by the addition of amounts of yttrium oxide ($Y_2O_3$, "yttria, yttrium"). As a result of the addition of yttria, yttria-stabilized tetragonal and cubic zirconia is obtained.

In one embodiment, the coloured ceramic powders and/or ceramic granules contain as colourant components $Er_2O_3$, $Fe_2O_3$, $Co_3O_4$, $MnO_2$, $NiO_2$, $Cr_2O_3$, $Pr_2O_3$, $Tb_2O_3$ and/or $Bi_2O_3$. In general, the different tooth colours are preferably obtained by adding the following colouring oxides, wherein the total amount of the colouring oxides in the powder mixtures is less than 0.7 wt. %:

Yellow: $Fe_2O_3$ (0.035-0.12 wt. %).

Pink: $Er_2O_3$ (0.0-0.6 wt. %)

Grey: $Co_3O_4$ or $MnO_2$ ($\leq 0.00007$ wt. %)

$Mn_2O_3$ and/or $Mn_3O_4$ ($\leq 0.002$ wt. %).

In a further preferred embodiment, $Co_3O_4$, $Mn_2O_3$ and/or $Mn_3O_4$ are used as colouring metal oxides to set a grey colour. $Co_3O_4$ is particularly preferred.

In a preferred embodiment, commercially available masterbatches are used as coloured ceramic powders. By using them, any desired colour of the ceramic mixture can be selectively produced. Preferably, commercially available powders from the manufacturer Tosoh are used as masterbatches, for example the Zpex® White, Zpex® Yellow and Zpex® Grey variants stabilized with 3 mol % yttria, the Zpex® 4 White, Zpex® Yellow and Zpex® Grey variants stabilized with 4 mol % yttria, and the Zpex® Smile, Zpex® Smile Yellow, Zpex® Smile Grey variants stabilized with 5 mol % yttria. A Zpex® Pink stabilized with erbium oxide can be universally used as a colouring masterbatch for all 4 mol % and 5 mol % stabilization types. Masterbatches increase process reliability and are easy to process.

In one embodiment, the ceramic mixture described herein contains from 35 wt. % to 99 wt. % in relation to the mass of the total ceramic mixture, preferably from 75 wt. % to 95 wt. % of the component (a), e.g. from 40 wt. % to 99 wt. %, from 45 wt. % to 99 wt. %, from 50 wt. % to 98 wt. %, from 55 wt. % to 98 wt. %, from 60 wt. % to 97 wt. %, from 65 wt. % to 97 wt. %, from 70 wt. % to 96 wt. %, from 76 wt. % to 96 wt. %, from 77 wt. % to 95 wt. % or from 80 wt. % to 95 wt. % of the component (a). The particularly preferred ceramic mixture described herein contains from 76 wt. % to 95 wt. % of the component (a).

In one embodiment, the ceramic mixture described herein contains amino alcohols such as ethanolamine, carboxylic acids such as maleic acid and citric acid, carboxylic acid salts, or vinylic carboxylic acids such as ascorbic acid, and salts thereof, as well as mixtures thereof as a dispersing agent (b), with preferably at least one dispersing agent being selected from ethanolamine, citric acid, citric acid salts and ascorbic acid. Alkali or ammonium salts of citric acid are preferably used. Particularly preferred are L-ascorbic acid and diammonium hydrogen citrate.

Further, citric acid salts in which two of the three carboxyl groups are associated with ammonium ions as counterions are preferred.

In a preferred embodiment, the ceramic mixture described herein contains from 0.01 wt. % to 15 wt. % of the dispersing agent, e.g. from 0.03 wt. % to 14 wt. %, from 0.05 wt. % to 13 wt. %, from 0.07 wt. % to 12 wt. %, from 0.09 wt. % to 11 wt. %, from 0.1 wt. % to 10 wt. % of the dispersing agent in relation to the weight of the sinterable particles, i.e. in relation to the weight of the uncoloured or coloured ceramic powder.

In one embodiment, the ceramic mixture described herein contains at least one hydrocolloid (c) selected from the group consisting of gelatine, gellan gum, hydroxypropyl guar, caseinate, agar, agarose, carrageenan, alginate, xanthan, dextran, scleroglucan, starch, cellulose, a cellulose derivative, pectin, gum arabic, galactomannans, glucomannan, and carubin, or mixtures thereof.

Preferably, the hydrocolloid is gelatine, agar, carrageenan, alginate, xanthan gum, starch, a cellulose derivative, pectin, and/or glucomannan, or mixtures thereof.

In a preferred embodiment, the ceramic mixture described herein contains an alginate as a hydrocolloid (c). Alginates can be any commercially available alginates or salts thereof. The alginate may be provided, for example, as a sodium alginate or as a potassium alginate.

In a preferred embodiment, the ceramic mixture described herein contains a combination of two, three, four or five hydrocolloids as a component (c).

In a preferred embodiment, the ceramic mixture described herein contains a combination of two hydrocolloids as a component (c).

In a particularly preferred embodiment, the ceramic mixture described herein contains a combination of the hydrocolloids alginate and pectin as a component (c).

The alginate may be provided, for example, as a sodium alginate or as a potassium alginate.

In another particularly preferred embodiment, the ceramic mixture described herein contains a combination of the hydrocolloids gelatine and xanthan gum as a component (c).

In a preferred embodiment, the ceramic mixture described herein contains from 0.001 wt. % to 15 wt. % of the hydrocolloid or a combination of hydrocolloids, e.g. from 0.003 wt. % to 14 wt. %, from 0.005 wt. % to 13 wt. %, from 0.007 wt. % to 12 wt. %, from 0.009 wt. % to 11 wt. %, from 0.01 wt. % to 10 wt. % of the hydrocolloid or a combination of hydrocolloids in relation to the weight of the sinterable particles, i.e. in relation to the weight of the uncoloured or coloured ceramic powder.

In one embodiment, the ceramic mixture described herein contains at least one solvent (d).

Suitable solvents (d) are any commercially available organic solvents. Suitable solvents include, for example, butyl acetate, acetic acid n-hexyl ester. Preferred low-boiling solvents are 1-octanol, propylene glycol diacetate, ethylene glycol diacetate, acetone, methyl ethyl ketone (MEK), isopropanol, ethanol, butanol, p-xylene, cyclohexanone, butyl acetate, pentyl acetate, hexyl acetate and water, wherein water is particularly preferred.

Suitable high-boiling components are solvents with a boiling point above 200° C. (under normal pressure). Preferred high-boiling solvents are liquid polyethylene glycols with a molecular weight between 150 and 600 g/mol, propylene glycol, dipropylene glycol, tripropylene glycol, poly(propyl glycols) with a molecular weight from 150 to 4000 g/mol, particularly preferred with a molecular weight from 150 to 600 g/mol, ethers thereof such as the methyl, ethyl, propyl, isopropyl, butyl, hexyl ethers, either as mono- or diethers; phthalates, such as dimethyl, diethyl, di-butyl phthalates; glycerol; dimethyl, diethyl, dipropyl, dibutyl adipates or glutarates; diethyl succinate; acetyl tri-n-butyl citrate.

Polar high-boiling solvents such as PEG (average molecular weight <600 g/mol), glycerol and 1,2-propanediol are particularly suitable for the combination with water.

The ceramic mixture may additionally contain at least one binder as a component (e).

According to the invention, ceramic mixtures containing non-reactive binders, i.e. binders that cannot be polymerized by free radicals, are preferred. In contrast to reactive binders, non-reactive binders do not form a covalent polymer network during curing. Therefore, the ceramic particles of the component (a) can shift relative to each other and thus partially relieve stresses during drying and/or debinding.

Preferred binders are those that are solid in pure form at 25° C. During the drying process, such binders solidify and provide an improved strength of the green body.

Preferred binders to be used include cellulose derivatives such as methyl-(MC), hydroxyethyl (HEC), hydroxypropyl methyl (HPMC) and hydroxybutylmethylcellulose (HBMC) as well as sodium carboxymethylcellulose (NaCMC). Other preferred binders are poly(vinyl alcohol) (PVA), poly(vinyl acetate) (PVAc), poly(vinyl pyrrolidone) (PVP), poly (acrylic acid) (PAA), copolymers of acrylic ester and acrylic acid (AE/AA), poly(ethyl acrylate) (PEA), poly(methacrylic acid) (PMAA), poly(methyl methacrylate) (PMMA), ammonium polyacrylate ($NH_4PA$), ammonium poly(methacrylate), poly(acrylic amide), gelatine and poly(ethylene glycol) (HO—$(CH_2CH_2O)_n$—OH) and copolymers of ethylene glycol and propylene glycol which have such a high molecular weight and/or such a high PEG content so high that they are solid at room temperature. Also here, the degree of polymerization n results from the molecular weights defined below.

Preferred binders are those that have a molecular weight from 1000 g/mol to 500,000 g/mol, preferably from 3000 g/mol to 200,000 g/mol, particularly preferred from 5000 g/mol to 100,000 g/mol.

In the case of poly(ethylene glycol), poly(proyplene glycol) and copolymers of ethylene glycol and propylene glycol, the average molecular weight Mw, which is calculated from the hydroxyl number measured according to the ASTM D4274 test method, is indicated. For other polymers, unless otherwise stated, the molecular weight Mn is the one that is determined by viscometry (viscosity average value) according to Ubbelohde.

In addition to their use as binders, polyethylene glycol and polypropylene glycol can also be used as plasticisers or softening agents.

If the binder and the dispersion medium show a strong interaction, as it is the case for polar binders and water, for example, this interaction can slow down the drying process, so that residues of the dispersion medium are still present after drying.

Thus, the type and amount of the binder can be used to adjust the drying kinetics to the process.

The binder is preferably adjusted to the dispersion medium and the particles of the ceramic powder and/or granules in such a manner that a homogeneous, stable suspension is obtained, i.e. that preferably no flocculation takes place. The stability of the suspension can be determined according to E. J. W. Verwey, J. Th. G. Overbeek: Theory of the stability of lyophobic colloids, Elsevier, New York 1948.

The binder (e) may be dispersed in the dispersion medium (d) in the form of small particles (so-called dispersion binders), but preferably the binder (e) is dissolved in the dispersion medium (d).

In a preferred embodiment, the ceramic mixture does not contain a binder (e).

Furthermore, the ceramic mixture according to the invention may contain commercially available preservatives as a component (f).

The ceramic mixture according to the invention may furthermore contain a plasticiser as a component (g). Commercially available plasticisers, such as polyethylene glycol and/or polypropylene glycol, can be used here.

The ceramic mixture according to the invention may furthermore contain an anti-drying agent as a component (h). Commercially available anti-drying agents, such as ethylene glycol and/or glycerol, can be used here.

The total amount of all components (a), (b), (c) and (d) and, if applicable, of the components (e), (f), (g) and (h) is 100 wt. %.

Preferably, the ceramic mixture according to the invention has the compositions indicated in Table 1:

TABLE 1

| | Preferred compositions of the ceramic mixture according to the invention | | |
|---|---|---|---|
| Component | Preferred ceramic mixture; content of the component in wt. % | Further preferred ceramic mixture; content of the component in wt. % | Particularly preferred ceramic mixture; content of the component in wt. % |
| Coloured/uncoloured ceramic powder (a) | 35-99 | 55-98 | 75-95 |
| Dispersing agent* (b) | 0.01-15 | 0.05-13 | 0.1-10 |
| Hydrocolloid* (c) | 0.001-15 | 0.005-13 | 0.01-10 |
| Solvent (d) | 1-65 | 2-45 | 5-35 |

*in relation to the weight of the sinterable component, i.e. in relation to the weight of the uncoloured or coloured ceramic powder.

In addition, the present invention relates to a method for producing a ceramic mixture as defined herein, which can be used for the production of moulded articles, in particular for the production of dental moulded articles, comprising the following steps:

(a) adding a dispersing agent to a solvent;

(b) producing a suspension of an uncoloured and/or a coloured ceramic powder and/or a ceramic granule and/or a combination thereof by adding an uncoloured and/or a coloured ceramic powder and/or a ceramic granule and/or a combination thereof to the solution of a dispersing agent obtained in step (a);

(c) producing an aqueous solution of at least one hydrocolloid;

(d) adding the aqueous solution of at least one hydrocolloid obtained in step (c) to the suspension obtained in step (b) so that an aqueous colloidal ceramic suspension is obtained; and (e) reducing the solvent content of the aqueous colloidal ceramic suspension obtained in step (d) so that a ceramic mixture is obtained.

An advantage of the method according to the invention is that the ceramic mixture obtained according to this method can be used without further workup as a starting material in additive processes for the production of moulded articles.

All components used for the production of the ceramic mixture according to the invention can be purchased.

In step (a), a dispersing agent described above is added to a solvent. Suitable solvents are any commercially available organic solvents. Suitable solvents include, for example, acetic acid butyl ester, acetic acid n-hexyl ester. Preferred low-boiling solvents are 1-octanol, propylene glycol diacetate, ethylene glycol diacetate, acetone, methyl ethyl ketone (MEK), isopropanol, ethanol, butanol, p-xylene, cyclohexanone, butyl acetate, pentyl acetate, hexyl acetate, and water, wherein water is particularly preferred.

High-boiling components which can be used are solvents with a boiling point of above 200° C. (under normal pressure). Preferred high-boiling solvents are liquid polyethylene glycols with a molecular weight between 150 and 600 g/mol, propylene glycol, dipropylene glycol, tripropylene glycol, poly(propylene glycol) with a molecular weight from 150 to 4000 g/mol, particularly preferred with a molecular weight from 150 to 600 g/mol, ethers thereof such as the methyl, ethyl, propyl, isopropyl, butyl, hexyl ethers, either as mono- or diethers; phthalates such as dimethyl, diethyl, di-butyl phthalates; glycerol; dimethyl, diethyl, dipropyl, dibutyl adipates or glutarates; diethyl succinate; acetyl tri-n-butyl citrate.

Polar high-boiling solvents such as PEG (average molecular weight <600 g/mol), glycerol and 1,2-propanediol are particularly suitable for the combination with water.

In step (d), the suspension obtained according to step (b) becomes the capacity to form a gel by the addition of the aqueous solution from step (c), and can thus be converted from a liquid or pasty state to a solid or gel-like state.

In step (e), the solvent content of the aqueous colloidal ceramic suspension obtained according to step (d) is reduced to a content from 1 wt. % to 60 wt. %, preferably from 2 wt. % to 45 wt. %, more preferably from 2 wt. % to 35 wt. %, particularly preferably from 5 wt. % to 35 wt. % and most preferably from 5 wt. % to 24 wt. %. The reduction of the content of the solvent can be achieved by a heating plate under constant stirring, by irradiation with infrared light, by the influence of microwaves, by the influence of heating elements or by slow evaporation of the solvent in a drying/climate cabinet under certain conditions.

The ceramic mixture according to the invention, which is preferably a colloidal ceramic mixture, is obtained as a process product of the above-described method. In a particularly preferred embodiment of the ceramic mixture, it is a colloidal ceramic paste.

Another subject matter of the invention is a ceramic mixture obtainable according to one of the methods described above.

The ceramic mixture, in particular the colloidal ceramic mixture of the present invention, is suitable as a starting material for the production of moulded articles, preferably for the production of dental moulded articles, preferably dental restorations, such as an inlay, an onlay, a veneer, a crown, a bracket, a bridge or a framework, an abutment or an implant.

Method According to the Invention for Producing a Moulded Article, in Particular a Dental Moulded Article A further task of the invention is to provide a simplified additive process for the production of moulded articles, in particular of dental moulded articles, which has fewer disadvantages than the additive processes described above. Furthermore, the method should make it possible to vary the chemical and physical properties of the moulded article in one dimension, in two dimensions or in three dimensions.

This task is solved by a method for producing a moulded article, in particular a dental moulded article, comprising the following steps:
- (a) applying a first ceramic mixture described herein to a carrier or on a positive model, wherein a moulded article is obtained;
- (b) solidifying the moulded article thus obtained by gelation to form a gel-like moulded article; and
- (c) possibly repeating steps (a) and (b) with a second or further ceramic mixture, which has the same composition as the first ceramic mixture or a different one.

In one embodiment of this method, step (a) is performed first, then step (b) is carried out.

In a preferred embodiment of this method, step (a) is performed first, then step (b) is carried out with a first ceramic mixture according to the invention. Subsequently, steps (a) and (b) are carried out with a second ceramic mixture according to the invention, which has a different composition than the first ceramic mixture according to the invention. Thereafter, steps (a) and (b) are carried out with a third ceramic mixture according to the invention, which has a different composition than the first and the second ceramic mixture according to the invention. Afterwards, steps (a) and (b) can be carried out with further ceramic mixtures according to the invention.

In an alternative embodiment of this method, step (a) is first repeated once or several times, then step (b) is performed.

In a preferred embodiment of this method, step (a) can be performed first with a first ceramic mixture according to the invention. Subsequently, step (a) can be repeated with a second ceramic mixture according to the invention. Thereafter, step (a) may be repeated with a third and further ceramic mixture according to the invention. Afterwards, step (b) is carried out.

Surprisingly, it was found that the layers of the moulded article can be built up horizontally and/or vertically using the method according to the invention. Depending on the proceeding, the chemical and physical properties can be changed in one dimension, in two dimensions or in three dimensions, if at least two ceramic mixtures are used. The method according to the invention makes it possible to build up layers with different compositions in one dimension, in two dimensions or in three dimensions. It is particularly advantageous that the colour, brightness and translucency of the moulded article to be produced, in particular of dental moulded articles, can be varied in one dimension, two dimensions or three dimensions by varying the chemical composition of the layers using the method according to the invention. Therefore, the method according to the invention makes it possible to produce dental moulded articles which have none, a two-dimensional or a three-dimensional colour, brightness and translucency gradient. This applies also to other physical properties of the moulded article, such as strength and hardness.

Moreover, it was surprisingly found that the method according to the invention, in particular step (a), can be advantageously carried out by means of a standard 3D printer.

The moulded article obtained by the method according to the invention is preferably a gel body.

The starting materials used in the method according to the invention are the ceramic mixtures described herein. Unexpectedly, it was found that when ceramic mixtures described herein are used and contain a combination of the hydrocolloids gelatine and xanthan gum in combination with ceramic powders and/or granules based on $ZrO_2$, only small amounts of these hydrocolloids are required to obtain green bodies therefrom which can be machined. The green bodies have a sufficiently high strength to be machined in the green state. Moreover, the combination of these hydrocolloids, unexpectedly, does not have a negative effect on achievable densities and the translucency.

In a preferred embodiment, the method according to the invention is an additive process that is suitable for the production of a dental moulded article, in particular for the production of an all-ceramic multi-material dental restoration.

In step (a), all commercially available carriers used by persons skilled in the art in additive processes can be used as carriers. Suitable carriers are inert with respect to the ceramic material. Carriers can be, for example, polymers, in particular PET, polyimide, and polyvinyl chloride (PVC); glass carriers, preferably made of float glass or borosilicate glass; metallic carriers, preferably made of stainless steel, aluminium, titanium alloys, copper alloys; carriers made of non-metallic, inorganic materials, such as ceramic carriers, preferably of $ZrO_2$, $Al_2O_3$, zirconia toughened alumina (ZTA), alumina toughened zirconia (ATZ), SiCx, SiNx, diamond like carbon, glassy carbon, BN, $B_4C$ or AlN; or carriers made of a combination of these materials.

In step (a), positive models can be any materials that can be processed in the form of a blank in a milling machine or also as a filament or resin or suspension via a printing process into an individual positive model. The term "positive model" is understood to mean a defined printing surface. Suitable positive models are inert with respect to the ceramic material. The positive models (printing surface) used in the method according to the invention are materials which are dimensionally stable and at the same time can exhibit a certain compressibility or viscoelasticity and/or are rigid and inflexible. For example, plastics or also ceramics or also metals can be used to produce the corresponding positive model.

For example, diverse plastics such as polylactic acid (PLA), acrylonitrile butadiene styrene (ABS), acrylonitrile styrene acrylate (ASA), polyethylene terephthalate (PET), glycolyzed polyester (PETG), polycarbonate (PC), polyether ether ketone (PEEK), polyether ketone ketone (PEKK), polypropylene (PP), polyvinyl acetate (PVA), polyamide (PA), thermoplastic polyurethane (TPU), polymethyl methacrylate (PMMA), polyurethane (PU), or metals such as stainless steel, aluminium, titanium alloys, copper alloys, or ceramics such as $ZrO_2$, $Al_2O_3$, ZTA, ATZ, SiN, SiC, $B_4C$, BN, AlN or waxes, which are already known in the dental field, can be used for the positive model.

In a particularly preferred embodiment of the method according to the invention, a ceramic mixture, preferably a colloidal ceramic paste, is applied to generated positive models by material deposition in step (a). The paste may be applied in horizontal layers and/or points, or in vertical layers or points.

Preferably, the material is deposited by means of a syringe-stamp system and/or an extruder system.

In a preferred embodiment of step (a), the surface of the positive model is additionally provided with a release agent so that the cured moulded article can be removed more easily from the surface of the positive model. Suitable release agents are solid at room temperature, i.e. at 25° C., and liquid at temperatures above 45° C.

Preferred release agents are waxes. Waxes which fall in the definition of the German Society for Fat Science (DGF) in the DGF method MI1 (75) are particularly preferred. By persons skilled in the art, such waxes are understood to be waxes which are kneadable at 20° C., are solid to brittle-hard, have a coarse to fine crystalline structure, are translucent up to opaque in colour but not glassy and melt above 40° C. without decomposition, are slightly liquid (low viscosity) slightly above the melting point, have a strongly temperature-dependent consistency and solubility, and can be polished under light pressure, or waxes that are already known in the dental field and are used as dipping waxes.

The layer thickness of the applied release agent can, if required, be adapted to the drying shrinkage of the moulded articles, for example, a release agent layer of 1.4 mm is applied for a drying shrinkage of 1.4 mm.

In step (a), the ceramic material is preferably applied continuously.

Preferably, layers of the ceramic material are applied which have a thickness from 0.01 mm to 5 mm, e.g. with a thickness from 0.02 mm to 4.9 mm, 0.03 mm to 4.8 mm, 0.04 mm to 4.7 mm, 0.05 mm to 4.6 mm, 0.06 mm to 4.5 mm, 0.07 mm to 4.4 mm, 0.08 mm to 4.3 mm, 0.09 mm to 4.2 mm, 0.1 mm to 4.1 mm, 0.2 mm to 4.0 mm, 0.3 mm to 3.9 mm, 0.01 mm to 3.8 mm, 0.01 mm to 3.7 mm, 0.01 mm to 3.6 mm, or from 0.01 mm to 3.5 mm.

In step (b) of the method according to the invention, in one embodiment, the ceramic moulded article may be solidified by gelation, by adding a metal salt solution, by setting a certain temperature, and/or by in situ gelatinization.

An advantage of the method according to the invention is that the gelation is not started by electromagnetic radiation, so that the use of toxic and environmentally harmful photopolymerizable monomers and photoinitiators can be avoided.

In step (b), aqueous metal salt solutions containing monovalent, divalent or trivalent metal cations and/or mixtures thereof are used. Preferably, aqueous solutions are used which contain as cations $Li^+$, $Na^+$, $K^+$, $Ca^{2+}$, $Ba^{2+}+$, $Sr^{2+}$, $Mg^{2+}$, $Al^{3+}$ and/or $Fe^{2+}$ ions and/or mixtures thereof and as anions $F^-$, $Cl^-$, $Br^-$, $S^{2-}$, $CO_3^{2-}$, $SO_4^{2-}$, $PO_4^{3-}$, $NO^{3-}$, the salts of citric acid and/or of acetic acid. Aqueous solutions which may contain $Ca^{2+}$ and/or $Ba^{2+}$ and/or $Sr^{2+}$ ions are particularly preferred. Aqueous solutions which contain $Ca^{2+}$ ions are, even more, particularly preferred. Suitable metal salt solutions are, for example, $CaCl_2$) solutions.

The metal salt solutions contain from 0.001 wt. % to 50 wt. % of the metal salt, e.g. from 0.002 wt. % to 45 wt. %, from 0.003 wt. % to 40 wt. %, from 0.004 wt. % to 35 wt. %, or from 0.005 wt. % to 30 wt. % of the metal salt, preferably at least 0.01 wt. % of the metal salt and maximally as much until a completely saturated solution is obtained.

In step (b), temperatures from −50° C. to 120° C., preferably temperatures from −25° C. to 90° C., particularly preferably temperatures from −10° C. to 85° C., are set to solidify the moulded article.

In one embodiment of the method according to the invention, in step (b) the solidification of the thus obtained moulded article by gelation is started by one or more of the following steps:

(b1) wetting a ceramic mixture described herein, preferably a colloidal ceramic paste, by means of a syringe and/or by means of an extruder and/or by atomization and/or by immersion of the moulded article in a metal salt solution; or (b2) going below a certain temperature, wherein the moulded article is preferably briefly cooled to a temperature of less than 35° C.; or (b3) exceeding a certain temperature, wherein the moulded article is preferably briefly heated to a temperature of higher than 35° C.; or (b4) in situ gelatinization, wherein the moulded article containing a calcium salt with low solubility is mixed with an acidifier.

In step (b1), the ceramic mixture is wetted with the metal salt solution preferably from all sides. In a particularly preferred embodiment of the method according to the invention, the metal salt solution is applied to the additively manufactured moulded article in a first step using a nozzle, and in a second step, it is immersed in a bath of metal salt solution.

Alternatively, gelation can be started according to step (b2) by going below a certain temperature. For this purpose, the moulded article is immersed for a short time, preferably less than 90 minutes, e.g. 85 minutes, 80 minutes, 75 minutes, 70 minutes, 60 minutes, 60 minutes, 55 minutes, 50 minutes, 45 minutes, 40 minutes, or for less than 30 minutes to a temperature of less than 35° C., in particular to less than 10° C., more particularly to less than 6° C., for example in a refrigerator/freezer, by means of ice spray, liquid nitrogen or other suitable cooling media. Step (b2) can be carried out after the application step (a). Alternatively, step (b2) can be performed in parallel during the application of the ceramic mixture according to step (a).

Alternatively, gelation can be started according to step (b3) by exceeding a certain temperature. For this purpose, the moulded article is heated for a short time, preferably less than 90 minutes, e.g. 85 minutes, 80 minutes, 75 minutes, 70 minutes, 65 minutes, 60 minutes, 55 minutes, 50 minutes, 45 minutes, 40 minutes, or for less than 30 minutes to a temperature higher than 35° C., in particular to temperatures higher than 50° C., more particularly to temperatures higher than 75° C., for example in a drying cabinet, in an oven, by thermal radiation (for example IR lamps), by heating rods or by other suitable heat sources. Step (b3) can be carried out after the application step (a). Alternatively, step (b3) can be carried out in parallel during the application of the ceramic mixture according to step (a).

Alternatively, gelation can be achieved by in situ gelatinization according to step (b4), wherein the moulded article containing a calcium salt with low solubility is mixed with an acidifying agent shortly before application (step (a)). Preferably, a moulded article containing $CaCO_3$ is mixed with D-(+)-Glucono-1,5-lactone, also referred to as D-Glucono-delta-lactone (GDL).

In the method according to the invention, one or more different ceramic mixtures may be used. According to step (c), steps (a) and (b) can be repeated with a second or further ceramic mixture which has the same composition as the first ceramic mixture or a different one, so that a moulded article can be produced as a process product which consists of several layers.

The repetition of steps (a) and (b), i.e. step (c), can be performed in one dimension, in two dimensions, or in three dimensions. Thus, the method according to the invention is, surprisingly, a very versatile process that makes it possible to produce moulded articles the chemical and physical properties of which do not vary, or vary in one dimension, in two dimensions, or in three dimensions.

According to a first embodiment of step (c), steps (a) and (b) are repeated with one and the same ceramic mixture. The moulded article is built up in horizontal and vertical layers. Thus, a moulded article built up in horizontal and vertical layers is produced from a ceramic mixture (step (c-h1), horizontal and vertical layer design from one material, mono-material moulded article).

In a second alternative embodiment of step (c), possibly after the solidification of the mono-material moulded article from step (c-h1), steps (a) and (b) are repeated using a second ceramic mixture which has a different composition than the first ceramic mixture. The second ceramic mixture is applied on top of the first ceramic mixture. Thus, a multi-material moulded article is produced from two ceramic mixtures (horizontal and vertical layer design of two materials, multi-material moulded article).

In a third alternative embodiment of step (c), optionally after the solidification of the mono-material moulded article from step (c-h1), the steps (a) and (b) are repeated with a second ceramic mixture which has a different composition than the first ceramic mixture. The second ceramic mixture is applied on top of the first ceramic mixture. Subsequently, a third or more ceramic mixtures may be applied. Thus, a multi-material moulded article is produced from three or more of ceramic mixtures (horizontal and vertical layer structure of three or more materials, multi-material moulded article).

Consequently, the method according to the invention can be used to produce a moulded article the chemical and physical properties of which vary in three dimensions, i.e. from the first layer to the second or further layer.

Thus, an advantage of the method according to the invention is that it is suitable for the production of multilayer moulded articles, in which several layers of ceramic mixtures with different compositions are stacked on top of each other, so that so-called multi-material moulded articles can be produced. It is particularly advantageous that the chemical and physical properties of the moulded articles can be varied in one dimension, in two dimensions or in three dimensions, so that colour, brightness and translucency gradients can be selectively adjusted. Therefore, the method according to the invention allows the production of dental moulded articles which, after sintering, have a colour gradient that resembles the one of a natural tooth.

In one embodiment, the method according to the invention can be used to obtain a moulded article the inner layer of which is made of a first material and the outer layer is made of another material.

In a preferred embodiment of the method according to the invention, the inner layer of the moulded article with a layer thickness from 0.01 mm to 1 mm is first applied according to step (a). This layer is then formed to a gel-like moulded article according to step (b) by adding a metal salt solution, by setting a certain temperature or by in situ gelatinization. The first layer can optionally be surface-finished before the next, i.e. a second, layer will be applied. Preferably, the first layer is designed in such a way that intermediate surface processing is not necessary.

Afterwards, a second layer with a thickness ranging from 0.01 mm to 1 mm is applied. Then, this layer is converted into a gel-like moulded article according to step (b) by adding a metal salt solution, by setting a certain temperature or by in situ gelatinization.

Therefore, a further object matter of the present invention is a gel-like moulded article obtainable by the method described above according to steps (a), (b) and (c). Preferably, this is a mono-material or a multi-material moulded article.

Furthermore, the present invention relates to a gel-like moulded article comprising an inner layer consisting of a first material and an outer layer consisting of another material obtainable by a method according to the invention described herein.

In a further embodiment of the method according to the present invention, the moulded article obtained in this way is post-processed in a further step (d) by means of subtractive processes in the gel-like state and/or in the dried state before sintering, preferably by subtractive processes such as, for example, cutting, polishing, grinding and milling. The moulded article obtained can be processed by means of all conventional mechanical processes.

Subsequently, the moulded articles obtained in this way can be sintered in a further step (e). Sintering is performed, for example, at a heating-up rate of 8-10° C./min to 1350-1550° C., which is maintained for 2 hours. The cooling rate is 8-10° C./min. The moulded articles are also suitable for rapid sintering. For example, rapid sintering proceeds at a heating-up rate of 8-10° C./min to 1350-1550° C., which is maintained for 30 minutes. The cooling rate is 40° C./min.

Thus, another subject matter of the present invention is a moulded article obtainable by the above-described process according to steps (a), (b), (c), (d) and (e).

In a preferred embodiment, this moulded article is a dental mono-material or multi-material moulded article produced by using a method according to the invention described herein. Particularly preferably, it is a multi-material dental restoration, such as an inlay, an onlay, a veneer, a crown, a bracket, a bridge or a framework, an abutment or an implant, the colour gradient of which resembles the colour and translucency of a natural tooth.

In a preferred embodiment, the method according to the invention is used to produce an all-ceramic multi-material dental restoration.

Another object matter of the invention is a method for producing a printed dental restoration, comprising one or more of the following steps:

(a) creating a virtual dental restoration by intraoral or extraoral scanning of the oral condition;

(b) designing a virtual model of the dental restoration using CAD software;

(c) overdimensioning the virtual tooth restoration according to the sintering shrinkage of the tooth restoration, if required;

(d) printing or milling out the possibly dimensioned tooth restoration from a dimensionally stable material, which is used as a positive model in the subsequent printing process;

(e) modelling an inner dentin core and an outer enamel layer using the scanned enamel layer based on the scanned tooth by the CAD software or by virtual predefined tooth restorations;

(f) separating the modelled tooth restoration, which may be overdimensioned, into horizontal layers;

(g) preparing trajectory and milling strategies for the application and subsequent removal of the printed (ceramic) materials used;

(h) applying a release agent described herein to the correspondingly overdimensioned, dimensionally stable, dental restoration;

(i) printing the virtually created dental restoration, which has been separated into horizontal layers, on the previously created dimensionally stable positive model according to the method described herein;

(j) solidifying the dental restoration by gelation according to the method described herein, in particular according to one of the steps (b1), (b2), (b3), or (b4);

(k) drying the printed dental restoration;

(l) processing the surface of the printed dental restoration.

In a further embodiment, the method according to the invention comprises an additional step (m) of sintering the printed dental restoration obtained according to step (l).

Step (a) can be performed using a commercially available scanner, e.g. in a dentist's surgery.

Step (b) can be performed by using CAD software.

In one embodiment in step (c), the individual sintering shrinkage of the material of the dental restoration, e.g. of the glass-ceramic, of ceramics based on $ZrO_2$, $Al_2O_3$, ZTA, ATZ, $B_4C$, SiC, $Si_3N_4$ or $TiO_2$, or of composite materials, preferably ceramics based on $ZrO_2$, $Al_2O_3$, ZTA or ATZ, can be compensated during the virtual creation of the dental restoration.

In step (d), the positive model can be made of a dimensionally stable and at the same time compressible or viscoelastic and/or stiff and inflexible material. The remaining material is used as a positive model in the later printing process. This positive model determines the shape of the cavity for the tooth restoration.

According to step (e), the inner dentin core of a dental restoration, preferably a tooth, as well as an outer enamel layer of the scanned tooth can be modelled by the CAD software or by virtually predefined dental restorations. The thickness of the applied dentin material or enamel material can be adjusted.

According to step (f), the modelled, possibly overdimensioned tooth restoration can be virtually separated into horizontal layers, preferably by means of a slicer software.

In step (i), the dental restoration is printed according to the method of the invention described herein. As a start, a first ceramic mixture corresponding to the desired composition of the dentin core is applied to the positive model, so that a moulded article is obtained. Then, a second ceramic mixture corresponding to the desired composition of the enamel layer is applied. The moulded article thus obtained is solidified to a gel-like moulded article by gelation.

In another embodiment of step (i), the dental restoration is produced by the creation of a multi-material design by using more than two different ceramic mixtures as starting materials. In this way, dental restorations with different optical and mechanical properties can be produced. In particular, dental restorations with specific colour and translucency gradients can be produced in this way.

In step (k), the dental restoration can be dried by means of heat-developing energy sources, such as an air climate/drying cabinet, infrared radiation or heating rods, or by means of high-energy microwaves, so that the dental restoration thus obtained can be further processed more quickly.

In step (l), the surface of the dental restoration thus obtained can be further processed according to the subtractive methods described herein to bring the outer surface of the printed dental restoration into its final shape.

In step (m), sintering of the printed dental restoration may be performed at temperatures ranging from 1350° C. to 1600° C.

The following examples are used to explain the invention. However, the invention is not limited to the examples.

EXAMPLES

Example 1—Preparation of a Ceramic Mixture According to the Invention

Example 1.1—General Method for Producing the Ceramic Mixture According to The Invention In step (a), the dispersing agent was added to the solvent and dissolved by stirring, for example using a magnetic stirrer. After dissolving the dispersing agent, the coloured or uncoloured ceramic debinded powder was added to the dispersant solution in several sub-steps with continuous stirring, for example with the aid of a stationary stirrer, thus obtaining a suspension.

The suspension was filled into a sealable plastic container. An appropriate amount of grinding balls, for example $ZrO_2$ grinding balls with a diameter of 2 mm, was added to the suspension. The amount of grinding balls depends on the size of the container and the amount of coloured or uncoloured ceramic powder. The container with the suspension was placed on the roller bench for at least 24 hours to destroy any agglomerates possibly existing in the suspension and to achieve a homogeneous dispersion of the components.

According to step (c), an aqueous solution of a hydrocolloid was separately produced. For this purpose, the appropriate amount of at least one hydrocolloid was colloidally dissolved or finely dispersed in a solvent. If several hydrocolloids are used in a mixture, the individual hydrocolloid solutions will be produced first in each case. Alternatively, several hydrocolloids can also simultaneously be colloidally dissolved or finely dispersed. For this purpose, a magnetic stirrer with a magnetic stir bar was used again. After the complete dispersion of the one or more hydrocolloids in the solution, the speed of the magnetic stirrer was reduced and the colloidal solution thus obtained was homogenized and deaerated by slow stirring.

According to step (d), the aqueous solution of the at least one hydrocolloid was added to the suspension of the uncoloured or coloured ceramic powder obtained according to step (b). The colloidal ceramic suspension thus obtained was homogenized on the roller bench for at least 24 hours until a homogeneous colloidal suspension was obtained.

In the last step (e), the solvent content of the still liquid homogeneous colloidal suspension was reduced by thermal impact, for example by a heating plate, at a temperature of 70° C. under continuous stirring until the ceramic mixture according to the invention was obtained. The ceramic mixture is preferably provided as a colloidal ceramic paste.

The ceramic mixture thus obtained was deaerated by a mixer, preferably by a dental mixer, and filled without air into cartridges.

Example 1.2—Preparation of a Ceramic Mixture with Sodium Alginate as a Hydrocolloid Table 2 shows the composition of the starting components of the ceramic mixture. All starting components were purchased.

TABLE 2

Composition of the starting components of the ceramic mixture

| Component | Content of the component in the ceramic mixture (wt. %) | Content of the component in the aqueous solution of a hydrocolloid |
| --- | --- | --- |
| Component (a): debinded 5Y—$ZrO_2$ (company Tosoh, Zpex ® Smile) | 64.30 | |
| Component (d): solvent for the dispersing agent (de-ionized water) | 19.32 | |
| Component (b): dispersing agent* (diammonium hydrogen citrate >98%, ultrapure Roth company) | 0.3 | |

TABLE 2-continued

Composition of the starting components of the ceramic mixture

| Component | Content of the component in the ceramic mixture (wt. %) | Content of the component in the aqueous solution of a hydrocolloid |
| --- | --- | --- |
| Component (b): dispersing agent* (L-ascorbic acid MP Biomedicals company) | 0.05 | |
| Component (c): sodium alginate* (Neupert Ingredients GmbH, 400-600 cps) | | 0.5 |
| Component (d): solvent for the hydrocolloid (deionized water) | | 15.83 |

*in relation to the solid content

In step (a), 1.52 g of the dispersing agents diammonium hydrogen citrate and 0.253 g of L-ascorbic acid were added to 152 g of deionized water (demineralized water) and dissolved by stirring, for example using a magnetic stirrer. After dissolving the dispersing agent, 506 g of the coloured ceramic debinded powder 5Y—$ZrO_2$ (Tosoh, Zpex® Smile) were added to the dispersant solution in several sub-steps by constant stirring, for example with the aid of a stationary mixer, so that a suspension was obtained.

The suspension was filled in a sealable plastic container. 600 g of $ZrO_2$ grinding balls with a diameter of 2 mm were added to the suspension. The container with the suspension was placed on the roller bench for 24 hours to destroy any agglomerates possibly existing in the suspension and to achieve a homogeneous dispersion of the components.

According to step (c), an aqueous solution of the hydrocolloid sodium alginate was produced separately. For this purpose, 2.54 g of sodium alginate were colloidally dissolved or finely dispersed colloidally in 124.6 g of deionized water (demineralized water). A magnetic stirrer with a magnetic stir bar was used again for this purpose. After the complete dispersion of the sodium alginate in the solution, the speed of the magnetic stirrer was reduced and the colloidal solution thus obtained was deaerated by slow stirring.

According to step (d), the aqueous solution of sodium alginate was added to the suspension of the coloured ceramic powder 5Y—$ZrO_2$ (Tosoh Zpex® Smile) obtained according to step (b). The colloidal ceramic suspension thus obtained was homogenized on the roller bench for at least 24 hours until a homogeneous colloidal suspension was obtained.

In the last step (e), the solvent content of the still liquid homogeneous colloidal suspension was reduced by thermal impact, for example, by the heating plate of a magnetic stirrer and by a continuous stirring action of a stationary stirrer at 70° C. until the ceramic mixture according to the invention containing sodium alginate as a hydrocolloid was obtained. The ceramic mixture is preferably provided as a colloidal ceramic paste.

The ceramic mixture thus obtained was mixed by a mixer, preferably by a dental mixer, deaerated and filled without air into cartridges.

Example 1.3—Preparation of a Ceramic Mixture with Gelatine and Xanthan Gum as Hydrocolloids Table 3 shows the composition of the starting components of the ceramic mixture. All starting components were purchased.

TABLE 3

| Composition of the starting components of the ceramic mixture | | |
|---|---|---|
| Component | Content of the component in the ceramic mixture (wt. %) | Content of the component in the aqueous solution of a hydrocolloid |
| Component (a): debinded 5Y—ZrO₂ (company Tosoh, Zpex ® Smile) | 64.81 | |
| Component (d): solvent for the dispersing agent (de-ionized water) | 19.36 | |
| Component (b): dispersing agent* (diammonium hydrogen citrate >98%, ultrapure, Roth company) | 0.3 | |
| Component (c): gelatine* (company AppliChem 128-192 Bloom) | | 0.25 |
| Component (c): xanthan gum* (Roth company, ultrapure) | | 0.125 |
| Component (d): solvent for the hydrocolloid (deionized water) | | 15.39 |

*in relation to the solid content

In step (a), 1.52 g of the dispersing agent diammonium hydrogen citrate were added to 150.86 g of deionized water (demineralized water) and dissolved by stirring, for example using a magnetic stirrer. After dissolving the dispersing agent, 505.14 g of the coloured ceramic debinded powder 5Y—ZrO₂ (Tosoh, Zpex® Smile) were added to the dispersant solution in several partial steps with continuous stirring, for example with the aid of a stationary stirrer, and thus a suspension was obtained.

600 g of ZrO₂ grinding balls with a diameter of 2 mm were added to the suspension. The container with the suspension was placed on the roller bench for 24 hours to destroy any agglomerates possibly existing in the suspension and to achieve a homogeneous dispersion of the components.

In step (c), two separate hydrocolloid solutions of gelatine and xanthan gum were produced in parallel. To produce a gelatine hydrocolloid solution, 1.27 g gelatine were dissolved in 59.65 g of deionized water (demineralized water). To produce a xanthan hydrocolloid solution, 0.635 g xanthan were dissolved in 60.285 g of deionized water (demineralized water). For this purpose, a magnetic stirrer with a magnetic stir bar was used. After the complete dispersion of the gelatine or xanthan in the solution, the speed of the magnetic stirrer was reduced and the colloidal solutions of gelatine or xanthan thus obtained were deaerated by slow stirring. After the complete colloidal solution or colloidal dispersion of the components in their respective solvent, both solutions were combined to one. The total solution of gelatine and xanthan gum was deaerated by slow stirring.

According to step (d), the aqueous combined solution of gelatine and xanthan gum was added to the suspension of coloured ceramic powder 5Y—ZrO₂ (Tosoh Zpex® Smile) obtained according to step (b). The colloidal ceramic suspension thus obtained was homogenized for at least 24 hours on the roller bench until a homogeneous colloidal suspension was obtained.

In the last step (e), the solvent content of the still liquid homogeneous colloidal suspension was reduced by thermal impact, for example by the heating plate of a magnetic stirrer and by a continuous stirring action of a stationary stirrer at 70° C. until the ceramic mixture according to the invention containing gelatine and xanthan gum as a hydrocolloid was obtained. The ceramic mixture is preferably provided as a colloidal ceramic paste.

The ceramic mixture thus obtained was mixed by a mixer, preferably by a dental mixer, and filled without air into cartridges.

Example 2—Moulded Articles According to the Invention

Example 2.1—General Method for the Production of a Moulded Article According to the Invention The cartridges required and filled for the production of the moulded articles were clamped in a holder manufactured according to the cartridge geometry. An appropriate nozzle with a diameter of 0.84 mm was fixed to the cartridge tip, which has a Luer-Lock connection point. The advantage of the Luer-Lock system is the possibility to adapt the nozzle diameter to any application quickly and without great effort. A commercially available Luer-Lock system was used.

The moulded article was produced by continuous paste strand deposition. Gelation was actively initiated during printing by cooling the paste to temperatures of ≤6° C. Alternatively, the moulded articles were cooled at the end of the printing process to accelerate or support gelation.

After a short cooling phase (≤5 min) to temperatures of ≤6° C., the moulded articles could be rapidly dried directly in the drying cabinet at higher temperatures, for example at temperatures of ≤60° C.). After the accelerated drying, the moulded articles were surface-processed to an almost final contour shape by subtractive processes. After processing, the moulded articles were dried to mass constancy.

In an additional process step, the moulded articles were sintered. Sintering was performed at a heating rate of 8-10° C./min to 1350-1550° C., which was maintained for 2 hours. The cooling rate was 8-10° C./min.

Example 2.2—General Method for the Production of a Moulded Article According to the Invention The cartridges required and filled for the production of the moulded articles were clamped in a holder manufactured according to the cartridge geometry. An appropriate nozzle with a diameter of 0.84 mm was fixed to the cartridge tip, which has a Luer-Lock connection point. The advantage of the Luer-Lock system is the possibility to adapt the nozzle diameter to any application quickly and without great effort. A commercially available Luer-Lock system was used.

The moulded article was produced by continuous paste strand deposition. Gelation was initiated after printing by dipping the moulded article in a metal salt solution.

After a short dwell time in the metal salt solution (≤15 min) and a short dwell time in air (≤15 min), the moulded article could be separated from the positive model and dried rapidly directly in the drying cabinet at higher temperatures, for example at temperatures of ≤60° C.). Following the accelerated drying, the moulded articles were surface-processed to an almost final contour shape by subtractive processes. After processing, the moulded articles were then dried to mass constancy.

In an additional process step, the moulded articles were sintered. Sintering was performed at a heating rate of 8-10° C./min to 1350-1550° C., which was maintained for 2 hours. The cooling rate was 8-10° C./min.

Example 2.3—Production of a Moulded Article from a Ceramic Mixture with Sodium Alginate as a Hydrocolloid Following the general method described in Example 2.2, several dental moulded articles, i.e. three dental crowns, were produced from the ceramic mixture with sodium alginate. FIG. 1 shows three different dental crowns made from the ceramic mixture with sodium alginate according to the invention and a subtractive process.

Example 2.4—Production of a Moulded Article from a Ceramic Mixture with Gelatine as a Hydrocolloid Following the general method described in Example 2.1, a moulded article was produced from the ceramic mixture with gelatine and xanthan gum.

For example, moulded articles in the form of thin discs were printed from this composition and formed to almost final-contour shapes by subtractive processes, such as grinding and polishing, so that they had a diameter of 14 mm (±2 mm) and a thickness of 1.2 mm (±0.2 mm) after sintering to full density. Density, strength and translucency were measured for these moulded articles.

Achieved densities, measured according to Archimedes' principle, averaged 6.025 g/cm³±0.044 g/cm³. Achieved strengths, measured by the ball-on-three ball method, averaged 661.1 MPa±118.7 MPa. Achieved translucency values, measured over black and white backgrounds in CIELAB colour space, were always above 30%.

In addition, the translucency of the thin disc, which was printed, brought to the almost final-contour shape by subtractive processes and sintered according to Example 2.4, was compared with the density and translucency of a second thin disc which was milled and sintered from a standard ZrO₂ round blank.

Figure 2:
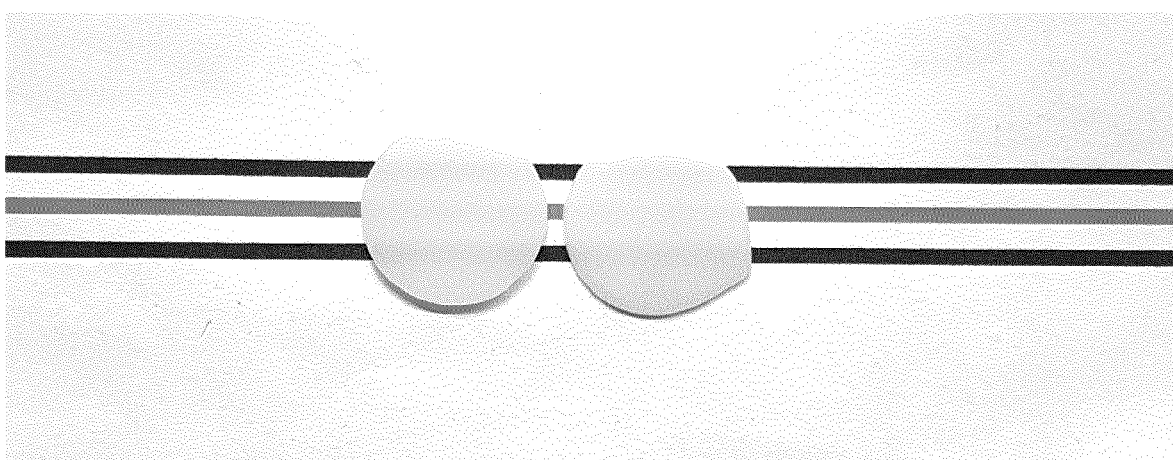
FIG. 2 shows two moulded articles, i.e. two thin discs, one of which was milled out of a standard $ZrO_2$ round blank (on the left) and one of which was produced by the method disclosed in the present invention and by a subsequent subtractive post-process from a ceramic mixture according to the invention containing gelatine and xanthan gum (on the right).

FIG. 2 shows two thin discs. The left thin disc was milled and sintered from a standard ZrO₂ round blank. The right thin disc was produced from a ceramic mixture with gelatine and xanthan gum and by a subsequent subtractive process and sintering process according to Example 2.4 using the method of the invention. The photo of the thin discs shows that the translucencies of the thin discs are comparable. Consequently, the methods according to the invention can be used to produce dental moulded articles that have comparable translucencies to milled dental materials.

The invention claimed is:

1. A method for producing a moulded article, comprising the following steps:
    (a) applying a first ceramic mixture to a carrier or to a positive model, wherein a moulded article is obtained;
    (b) solidifying the obtained moulded article by gelation to form a moulded article; and
    (c) optionally repeating steps (a) and (b) with a second or further ceramic mixture which has the same composition as the first ceramic mixture or a different one, wherein each of the ceramic mixtures comprises the following components: an uncoloured and/or a coloured ceramic powder based on ZrO₂, Al₂O₃, zirconia toughed alumina (ZTA), alumina toughed zirconia (ATZ), B₄C, SiC, or Si₃N₄, wherein the ZrO₂ is stabilized, and/or an uncoloured and/or a coloured ceramic granule based on ZrO₂, Al₂O₃, zirconia

30 toughed alumina (ZTA), alumina toughed zirconia (ATZ), B₄C, SiC, or Si₃N₄, wherein the ZrO₂ is stabilized, and/or combinations thereof based on ZrO₂, Al₂O₃, zirconia toughed alumina (ZTA), alumina toughed zirconia (ATZ), B₄C, SiC, or Si₃N₄, wherein ZrO₂ is stabilized;
    at least one dispersing agent;
    at least one hydrocolloid selected from the group consisting of carubin, gellan gum, hydroxypropyl guar, agarose, carrageenan, alginate, dextran, starch, gum arabic, galactomannans, glucomannan, xanthan, scleroglucan, caseinate, or mixtures thereof; and
    at least one solvent.

2. The method according to claim 1, wherein in step (b) the solidification of the moulded article by gelation is carried out by adding a metal salt solution, by setting from −50° C. to 120° C. and/or by in situ gelatinization.

3. The method according to claim 1, wherein in step (b) the solidification of the obtained moulded article by gelation is started by one or more of the following steps:
    (b1) wetting a ceramic mixture according to claim 1 by a syringe and/or by an extruder and/or by atomization and/or by immersing the moulded article in a metal salt solution; or
    (b2) going below a specific temperature, wherein the moulded article is cooled to a temperature of less than 35° C.; or
    (b3) exceeding a certain temperature, wherein the moulded article is heated to a temperature higher than 35° C.; or
    (b4) in situ gelatinization, wherein the moulded article, which contains a calcium salt with low solubility is mixed with an acidifying agent.

4. The method according to claim 1, wherein in step (a) a ceramic mixture is applied onto generated positive models by material deposition,
    (a1) by a syringe-stamp system and/or by an extruder system; and/or
    (a2) wherein a surface of the positive model is additionally provided with a release agent so that the cured moulded article can be removed more easily from the surface of the positive model; and/or
    (a3) the application is carried out continuously; and/or
    (a4) layers with a thickness from 0.01 mm to 5 mm are applied.

5. The method according to claim 1, wherein the obtained moulded article is post-processed in a further step (d) by at least one subtractive process in a green state prior to sintering.

6. A method for producing a printed dental restoration, comprising the following steps:
    (a) printing or milling out the dental restoration from a dimensionally stable material, which is used as a positive model in the subsequent printing process;
    (b) modelling an inner dentin core as well as an outer enamel layer based on a scanned tooth via CAD software or by virtual predefined tooth restorations;
    (c) separating a moulded tooth restoration into horizontal layers;
    (d) preparing path and milling strategies for the application as well as subsequent removal of the printed (ceramic) materials used;
    (e) reapplying a release agent described herein to the correspondingly overdimensioned, dimensionally stable dental restoration;
    (f) printing a virtually created tooth restoration, which has been separated into horizontal layers, on the previously created overdimensioned, dimensionally stable positive model according to the method described herein;

(g) solidifying the dental restoration by gelation according to to one of the steps (b1), (b2), (b3), or (b4) as defined in claim 3;

(h) drying the printed dental restoration;

(i) machining the surface of the printed dental restoration; and (j) sintering the printed dental restoration.

7. The method of claim 1, wherein the first ceramic mixture comprises at least one anti-drying agent, wherein the anti-drying agent comprises ethylene glycol and/or glycerol.

\* \* \* \* \*